W. SEHL.
FEED BAG.
APPLICATION FILED SEPT. 20, 1910.
1,042,155.
Patented Oct. 22, 1912.
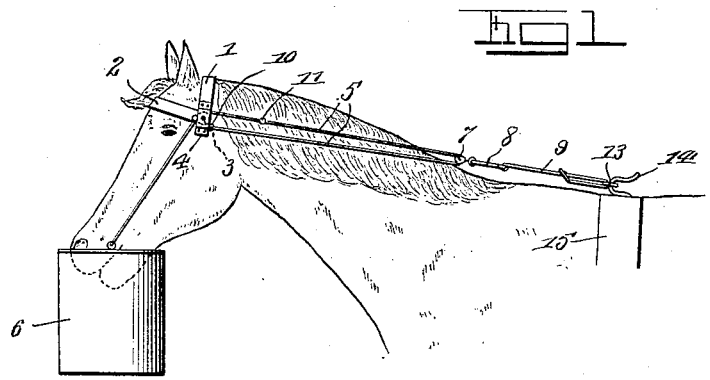
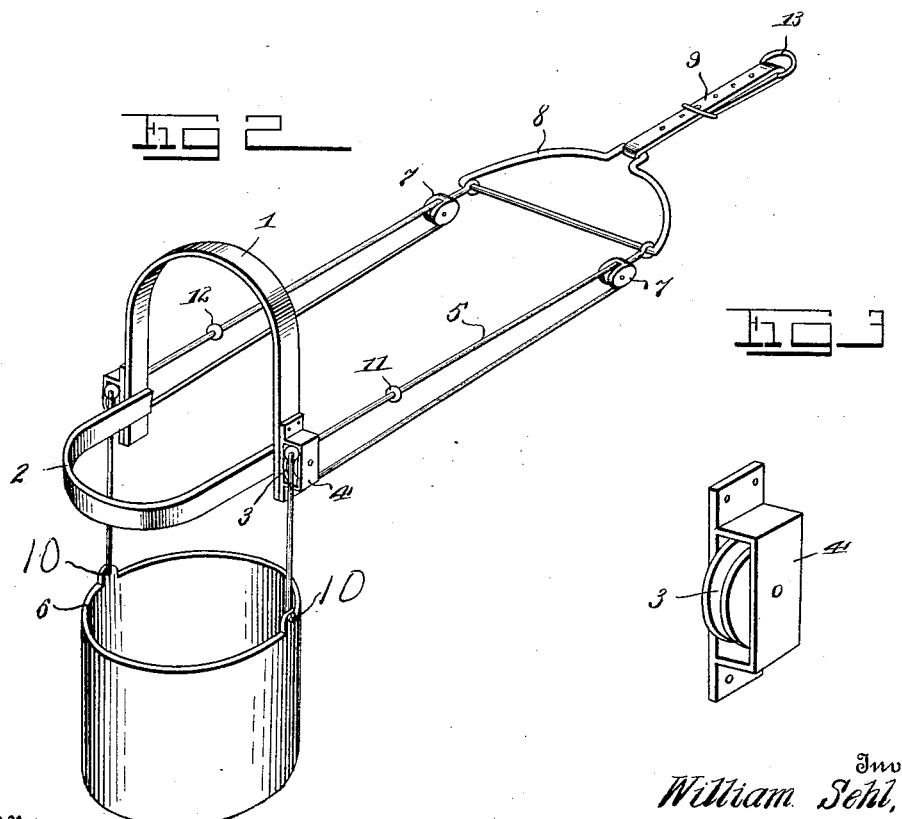
Inventor
William Sehl,
By Victor J. Evans
Attorney
Witnesses

UNITED STATES PATENT OFFICE.

WILLIAM SEHL, OF PRESCOTT, ARIZONA.

FEED-BAG.

1,042,155.

Specification of Letters Patent.

Patented Oct. 22, 1912.

Application filed September 20, 1910. Serial No. 582,881.

*To all whom it may concern:*

Be it known that I, WILLIAM SEHL, a citizen of the United States, residing at Prescott, in the county of Yavapai and State of Arizona, have invented new and useful Improvements in Feed-Bags, of which the following is a specification.

This invention relates to improvements in feeding gear for the attachment of nose bags, tubs or other feed receptacles, and the primary object of the invention is to provide a device of this character which may be easily and quickly attached to the head of an animal and which is so constructed and arranged as to effectively support the feed bag to allow the free movement of the horse's head without danger of the animal wasting the feed from the bag and so that the animal is free to breathe when its head is either raised or lowered in the bag.

With the above, and other objects in view, which will appear as the description progresses, the invention resides in the novel construction and combination of parts hereinafter fully described and claimed.

In the accompanying drawings, Figure 1 is a view of the device in its attached position upon an animal. Fig. 2 is a perspective view of the device detached. Fig. 3 is a similar view of one of the pulleys employed upon the head strap and brow band.

In the accompanying drawings the numeral 1 designates the head strap and 2 the brow band connected with the ends of the head strap. The head strap 1 is adapted to be positioned behind the ears of the animal while the brow band engages the brow of the animal directly below its ears, as clearly illustrated in Fig. 1 of the drawings, and the said head strap and brow band form sufficient harness for attaching the improvement to the head of an animal. The head strap 1 and the brow band 2 at their points of connection are provided with pulleys 3. These pulleys 3 are each provided with a casing 4 so that the feeding, chain or loop, designated by the numeral 5 may be free to travel over the said pulley but cannot be accidentally removed therefrom. The free ends of each of the said feeding elements 5 are connected with the feed bag 6, and each of the said elements 5 are engaged by pulleys 7 secured upon the transverse connecting bar of a stirrup 8. The stirrup 8 is formed with the usual strap receiving opening or depression, the latter being adapted for the reception of an adjusting strap 9. The lower flight of each of the members 5 are securely connected with the head stall as at 10. The upper flight of each of the feeding cords is provided with a pair of spaced knots or enlargements 11 and 12, and the said enlargements are adapted to contact the housing 4 of the pulley 3 so as to limit the movement of the bag when the animal raises or lowers his feed. The adjusting strap 9 comprises a pair of members, one being formed with a suitable buckle and the other being provided with a plurality of perforations adapted to be engaged by the buckle, and the free end of the strap 9 is provided with a suitable ring 13 which is adapted to engage the goose 14 upon the saddle 15 of the harness which is attached to the animal.

From the above description, taken in connection with the accompanying drawing, it will be noted that the device provides a substantially automatic feeding bridle, the same comprising few parts, which may be easily and quickly secured upon the animal, which is cheap in construction, and which is thoroughly reliable and efficient, and while I have illustrated and described the preferred embodiment of the improvement, minor changes of construction, within the scope of the following claim may be resorted to if desired.

Having thus fully described the invention, what I claim as new is:—

In a support for feed bags embodying a head strap and a brow strap connected thereto, the combination of casings secured to the opposite ends of said head strap, pulleys mounted in the said casings, a horizontally disposed stirrup member provided with a transverse bar, pulleys supported at the opposite ends of said transverse bar and spaced therefrom, said pulleys being spaced from the first mentioned pulleys and disposed in line therewith, flexible elements having one end connected at the opposite sides of the bag and their other ends to the casing, the intermediate portion of said flexible elements forming loops extending rearwardly from the bag and operatively associated with both sets of said pulleys, an adjusting strap having one end connected to the said stirrup and extending rearwardly therefrom, said strap being folded upon itself to provide a loop, a ring in said loop, and the opposite end of said strap being provided with a buckle adjustably engaging the intermediate portion thereof, substantially as and for the purpose described.

In testimony whereof I affix my signature in presence of two witnesses.

WILLIAM SEHL.

Witnesses:
 A. J. HERNDON,
 P. J. KEOHANE.

Copies of this patent may be obtained for five cents each, by addressing the "Commissioner of Patents, Washington, D. C."